United States Patent [19]

Okura et al.

[11] 4,439,029
[45] Mar. 27, 1984

[54] CAMERA WITH INFORMATION TRANSMITTING ELEMENTS

[75] Inventors: Zenichi Okura, Ichikawa; Shinsuke Kohmoto, Tokyo, both of Japan

[73] Assignee: Asahi Kogaku Kogyo Kabushiki Kaisha, Tokyo, Japan

[21] Appl. No.: 448,692

[22] Filed: Dec. 10, 1982

[30] Foreign Application Priority Data

Dec. 17, 1981 [JP] Japan ................................. 56-204216

[51] Int. Cl.³ .............................................. G03B 7/00
[52] U.S. Cl. ..................... 354/479; 354/286; 354/289.12
[58] Field of Search ................. 354/21, 46, 286, 289, 354/59, 22

[56] References Cited

U.S. PATENT DOCUMENTS

| | | | |
|---|---|---|---|
| 3,950,775 | 4/1976 | Toyama et al. | 354/289 |
| 4,104,649 | 8/1978 | Tanaka et al. | 354/286 |
| 4,118,713 | 10/1978 | Murakami et al. | 354/286 |
| 4,236,803 | 12/1980 | Shimomura | 354/286 |
| 4,236,804 | 12/1980 | Toyoda et al. | 354/286 |
| 4,309,088 | 1/1982 | Uchida et al. | 354/21 |
| 4,349,272 | 9/1982 | Holthusen | 354/21 |
| 4,357,089 | 11/1982 | Okura et al. | 354/286 |
| 4,382,669 | 5/1983 | Tano et al. | 354/286 |
| 4,400,075 | 8/1983 | Tomori et al. | 354/286 |

FOREIGN PATENT DOCUMENTS 53-143320  12/1978  Japan ................................. 354/46

*Primary Examiner*—Russell E. Adams
*Attorney, Agent, or Firm*—Christie, Parker & Hale

[57] ABSTRACT

A camera has a camera body with a lens receiving mount, an interchangeable lens having a mount removably engageable with the camera body mount, and a plurality of information transmitting elements. The plurality of information transmitting elements comprise a light source in the camera body, light receivers in the camera body corresponding to the respective elements, optical fibers in the camera body corresponding to the respective elements for coupling light from the source to the lens receiving mount and from the lens receiving mount to the receivers, and light transmitters in the lens for returning light associated with the optical fibers of selected elements to the light receivers of the selected elements. The selected elements represent information transferred from the lens to the camera body.

10 Claims, 4 Drawing Figures

CAMERA WITH INFORMATION TRANSMITTING ELEMENTS

BACKGROUND OF THE INVENTION

The present invention relates to a mechanism for transfer of various information concerning individual objectives to a camera body and, more particularly, to such a mechanism adapted to transfer lens side information, such as specific diaphragm value information (fully opened aperture value and minimum aperture value) and diaphragm control changeover information between automatic and manual diaphragm control modes, to the camera body through optical fibers.

As a method for transfer of information available on the lens side (referred to hereinafter as lens side information) such as specific diaphragm value information and control mode changeover information to the camera body, U.S. patent application Ser. No. 237,987, filed Feb. 25, 1981, now U.S. Pat. No. 4,357,089, discloses the method in which the camera body mount and the lens mount opposed to said camera body mount are provided in their mutually confronting surfaces with electrical contacts. The disclosure of this application is incorporated herein by reference.

However, such method of prior art relying upon the electrical contacts has been disadvantageous in that a plurality of electrical contacts must be incorporated into a very small surface areas of respective mounts and electrical insulation must be provided between the respective mounts and the associated electrical contacts. Thus fabrication of such mechanism has been unpractically complicated and difficult.

SUMMARY OF THE INVENTION

The present invention provides an improved information transfer mechanism which is as reliable as the referenced mechanism utilizing electrical contacts and more easily fabricated than this mechanism.

To achieve this, the present invention performs the desired information transfer between the objective, i.e., interchangeable lens, and the camera body not by electricity, but by light beams. More specifically, the light beams as information transfer media are not freely propagated in the air but channeled or guided through transparent glass or plastic rods to obtain an information transfer mechanism capable of minimizing loss of light and controlling the direction of light propagation.

Specifically, a camera has a camera body with a lens receiving mount, an interchangeable lens having a mount removably engagable with the camera body mount, and a plurality of information transmitting elements. The plurality of information transmitting elements comprise a light source in the camera body, light receivers in the camera body corresponding to the respective elements, optical fibers in the camera body corresponding to the respective elements for coupling light from the source to the lens receiving mount and from the lens receiving mount to the receivers, and light transmitters in the lens for returning light associated with the optical fibers of selected elements to the light receivers of the selected elements. The selected elements represent information transferred from the lens to the camera body.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENTS

Figure 1:
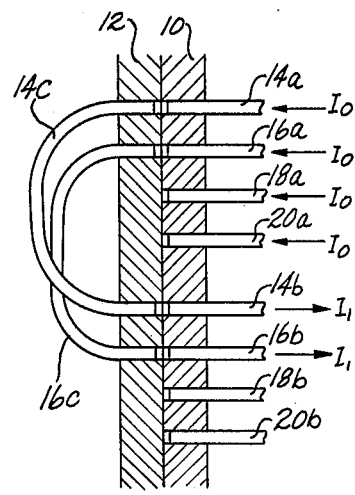
FIG. 1 is a side-sectional view of a lens mount and a camera body mount illustrating the principles of one embodiment of the invention.

FIG. 1 schematically illustrates a conception of information transfer mechanism utilizing optical fibers according to the present invention in a section through a camera body mount 10 to which a lens mount 12 has been coupled. Reference $I_0$ designates incident light beams coming from respective light emitting elements provided within the camera body. Optical fibers 14a, 16a, 18a, 20a, . . . . fixed to the camera body mount 10 are coupled, at their end surfaces remote from said mount 10, to a single light emitting element or separate light emitting element and function to direct steady light beams to the objective. Optical fibers 14b, 16b, 18b, 20b, . . . . also fixed to the camera body mount 10, serve to transfer information from the objective to an arithmetic circuit arranged within the camera body and are similarly coupled at their ends remote from the mount 10 to associated light receiving elements. Such an arithmetic circuit is shown as block C in FIG. 2 of application Ser. No. 235,839, filed Feb. 19, 1981, the disclosure of which is incorporated fully herein by reference. The light beams which have passed through these optical fibers 14a, 16a, 18a, and 20a are turned back into the camera body through the light transfer system 14c, 16c established in the objective based on the information representing specific diaphragm values of individual objectives or changeover of control mode. With the specific embodiment of FIG. 1, in which light beams of an intensity $I_1$ are guided by the optical fibers 14b, 16b into the camera body, the desired information such as the specific diaphragm values of individual objectives and the control mode changeover information may be determined by checking whether or not the light beams are present at the ends of the respective optical fibers 14b, 16b, 18b, 20b, . . . . remote from mount 10. From the view point of convenience of handling, efficiency of coupling at the end surfaces, and tolerance for positional misalignment between mounts 10, 12 occurring when the objective has been coupled to the camera body, the optical fiber is preferably 1 to 3 mm in diameter.

The information on specific diaphragm values of individual objectives is preferably binary coded, the number and relative positioning of the light transfer system 14c or 16c within the objective determining the binary values "1" and "0" of the binary code. Concerning the control mode changeover information, there may be provided a similar light transfer system within the objective so that said light transfer system is allowed to make light guiding or prevented from such light guiding in response to operation of control mode changeover.

In view of the fact that damage occurring in the end surfaces of the optical fibers would reduce the light coupling efficiency, it is preferred that the externally exposed end surfaces are slightly recessed from the surfaces of the mounts 10, 12 for protection of these end surfaces. It is also preferred to provide the end surfaces of the optical fibers with an antireflection coating.

Although the light transfer system 14c, 16c within the objective is shown as if each comprises a single optical fiber, it should be understood that such construction is given here only as illustrative example. Obviously, said light transfer system 14c, 16c may respectively comprise a single optical fiber utilizing flexibility thereof. However, it is preferred that in the lens mount 12 similar optical fibers are provided at positions respectively opposed to the optical fibers 14a, 16a, 18a, 20a, and 14b, 16b, 18b, 20b. . . . when the objective is mounted to the camera body. The optical fibers provided in the lens mount 12 are fixed at the positions slightly recessed from the camera body side end surface of said lens mount 12. This is to avoid damage of the end surfaces of these optical fibers as in the case of the previously mentioned camera body side optical fibers. Openings formed in the mount 12 through which the optical fibers are inserted are preferably sealed tightly so that dust is prevented from entering into the objective.

Figure 2:
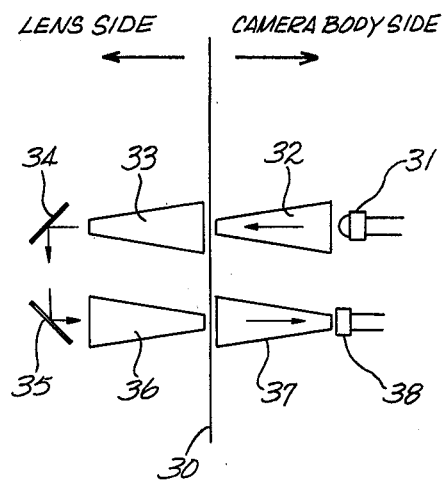
FIG. 2 is a schematic view of another embodiment of the invention.
Figure 3:
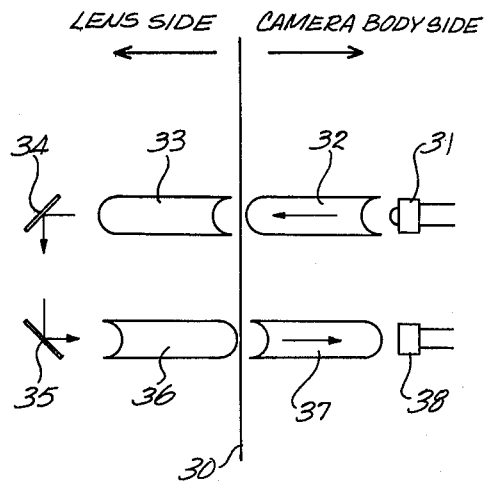
FIG. 3 is a schematic view of yet another embodiment of the invention.

FIGS. 2 and 3 show embodiments of the optical system arranged so as to improve the light coupling efficiency between the mounts 10, 12. Although only one unit or one bit (in binary coding) of the light transfer system is shown for simplicity of illustration as a case requiring light transfer within the objective, it should be understood that further units of the light transfer system of similar arrangement may be present at the positions corresponding to necessary information bits.

A middle solid line 30 indicates an interface between the lens mount and the camera body mount when the objective is mounted on the camera body, and the left side corresponds to the objective, and the right side corresponds to the camera body.

A steady light beam coming from a light emitting element 31 such as a luminous diode is guided by an optical fiber 32 to an optical fiber 33 across the interface line 30. The light beam exiting from the optical fiber 33 is then turned 180° by total reflection mirrors 34, 35 arranged according to the so-called double mirror principle onto an optical fiber 36. The light exiting from this optical fiber 36 is directed across the interface line 30 to an optical fiber 37, which guides the light beam to a light receiving element 38. It is obviously possible to replace said pair of total reflection mirrors 34, 35 by a single rectangular prism.

According to the embodiment of FIG. 2, the respective optical fibers 32, 33, 36, 37 employed therein are shaped substantially as cones each having a relatively large diameter at the light entrance side and a relatively small diameter at the light exit side to improve the light coupling efficiency between the light emitting elements and the associated optical fibers, between the optical fibers themselves, and between the optical fibers and the associated light receiving elements. Such configuration of the optical fibers substantially as cones permits, for example, the optical fiber 32 to catch the light beams coming from the light emitting element 31 easily and in large amount. Also, a satisfactory light coupling is maintained across interface line 30, for example, between the optical fibers 32, 33 even when there is a slight relative displacement between said two fibers transversely of the direction of light beam travel. The embodiment of FIG. 2 permits accordingly, the tolerance for securing the optical fibers to the respective mounts to be substantially larger than in the case of cylindrical optical fibers.

With the optical fibers thus conically shaped, light leakage may occur around the cone depending on the angle of incidence, but this may be avoided by shielding the peripheral surface of the fiber with metallic material to enhance the refelection coefficient on said peripheral surface up to 100 percent.

FIG. 3 shows an embodiment in which the entrance side surface of the optical fiber is formed as a concave surface while the exit side end surface is formed as a convex surface so that the light beam may be captured over a relatively wide solid angle at the entrance side, while the divergent angle of the light beam at the exit side may be reduced. In consequence, the embodiment of FIG. 3 permits a larger tolerance for securing the optical fibers, particularly in the direction of light beam travel, as compared to the linear optical fibers. With this embodiment, accordingly, the light coupling efficiency itself will be free from any substantial influence even when more or less axial displacement of the optical fibers occurs.

In the embodiments of FIGS. 2 and 3, the control mode changeover information may be effectively transferred to the camera body by such arrangement that the lens side optical path is interrupted or opened by operation of a changeover member provided in the objective. These embodiments of FIGS. 2 and 3 may be modified to achieve transfer of the specific diaphragm value information in such a manner that the lens side optical fibers 33, 36 are eliminated and the total reflection mirros 34, 35 are directly formed on the surface of the mount 12. Specifically, a trapezoidal notch is formed in the mount 12 at the position where the total reflection mirrors should be provided, and the inclined surfaces of said notch are utilized as the total reflection mirrors 34, 35.

Figure 4:
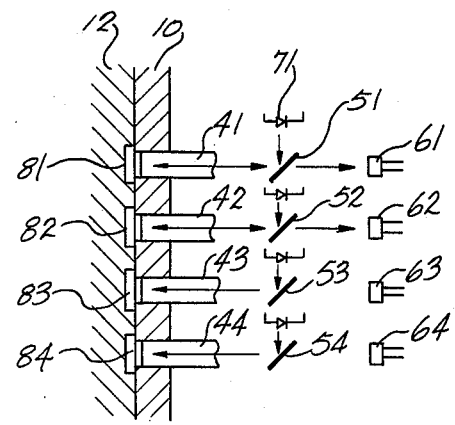
FIG. 4 is a side-sectional view of a lens mount and a camera body mount illustrating still another embodiment of the invention.

FIG. 4 shows an embodiment in which there are provided optical fibers only at the camera body side and these optical fibers are utilized as bidirectional light transfer media. Although four optical fibers and the associated elements are shown in FIG. 4, it should be understood that there are practically present in such light transfer system a number of elements corresponding to the number of information bits to be transferred to the camera body.

One complete light transfer system comprises an optical fiber 41, a beam splitter 51, a light emitting element 71 and a light receiving element 61. A light beam coming from the light emitting element 71 is guided through the beam splitter onto the optical fiber 41. Then the beam is reflected or absorbed by a reflector or an absorber, respectively, provided on the surface of the lens mount 12, depending upon the information such as the specific diaphragm values of individual objectives or the control mode changeover information. In FIG. 4, the optical system is shown as comprising the reflectors 81, 82 need not be provided as a separate means and the absorbers 83, 84 may be located at an appropriate position so far as the output of each light receiving element provides an output level difference which is sufficient to discriminate whether the case is of reflection or absorption, because the end surface of the mount 12 itself normally serves as a mirror surface having a relatively high reflection coefficient. Here, the term "absorber" does not necessarily mean a separate means made of a material different from that of the mount 12, but it only refers to a surface adapted for absorption of most of incident light, not reflection thereof. Therefore, the absorbers 83, 84 may be a portion of the mount 12 at an appropriate position which is worked to have a lower reflection coefficient.

The light beams reflected by the reflectors 81, 82 are guided through the same optical fibers 41, 42 and then through the beam splitters 51, 52 onto the associated light receiving elements 61, 62. Concerning the optical fibers 43, 44, on the other hand, the absorbers 83, 84 arranged on the lens mount 12 prevent the light beams from being reflected and, accordingly, no light beams are incident upon the associated light receiving elements 63, 64.

As used herein, the term "light receiving element" refers to a device for detecting the presence of incident light and producing an electric signal response to such light, such as a photo cell.

Concerning the previously mentioned control mode changeover information, there may be provided an arrangement such that a changeover between the reflector 81 and the absorber 82 occurs in response to the corresponding changeover operation performed in the objective. This arrangement is easily implemented by those skilled in the art and will be described in no more detail.

In the embodiments of FIGS. 1 through 3, it is necessary to provide the optical fibers 14a, 16a, 18a, 20a, 32 in the camera body mount 10 for directing the light of a constant intensity corresponding to the source voltage in the electric circuit to the objective and also to provide the optical fibers 14b, 16b, 18b, 20b, 37 for receiving the lens side information namely two fibers for each bit of information. In the embodiment of FIG. 4, on the other hand, it is necessary to provide beam splitters in association with the respective optical fibers and accordingly to maintain a high luminous intensity in the light emitting elements, but it is possible to reduce the number of the optical fibers to be provided in the mount by half. This is a highly advantageous feature from the viewpoint of the inevitably limited surface area of the mount.

The features of the embodiments of FIGS. 1 through 4 which have been described hereinabove may be utilized in combination with each other. For example, it is possible to employ the embodiment of FIG. 4 for the specific diaphragm value information and at the same time to employ the embodiment of FIGS. 2 or 3 for the control mode changeover information. Furthermore, a combination of embodiments of FIGS. 2 and 3, in which the conical optical fiber has its entrance end surface formed concave and its exit end surface formed convex, permits a larger tolerance for displacements along and transversely of the direction of light beam travel in securing the optical fibers to the mounts and for the relative placement between the lens mount and the camera body mount. In terms of the claim language used hereinafter, optical fibers 14c, 16c, in FIG. 1, optical fibers 33, 36, and mirrors 34, 35 in FIGS. 2 and 3, and reflectors and absorbers 81 through 84 in FIG. 4 comprise light transmitting means in the lens for returning light to the light receivers in the camera body. Optical fibers 14a, 16a, 18a, 20a and optical fibers 14b, 16b, 18b, 20b in FIG. 1, optical fibers 32, 37 in FIGS. 2 and 3 and optical fibers 41, 42, 43, 44 and beam splitters 51, 52, 53, 54 in FIG. 4 comprise the optical fiber means in the camera body. The light transmitting means in the lens returns light associated with the optical fiber means of selected elements to the light receivers of the selected elements. The term "selected" elements refers to a number of elements fewer than the total number of information transmitting elements.

As will be apparent from the foregoing description of the specific embodiments of the present invention, the information transfer mechanism according to the invention utilizes an optical fiber as the information transfer media, and, as a result, there is no requirement for electrical insulation between the respective mounts and the electrical contacts as in the case where the surfaces of the respective mounts are provided with the electrical contacts confronting one another, and fabrication of the mounts are remarkably simplified. According to the present invention moreover, all the disadvantages of mechanical contacts such as wear appearing on the electrical contacts and erroneous functioning when said contacts accidentally come in mutual touch as the objective is coupled to the camera body may be totally avoided, since the lens side optical fibers are reliably kept spaced from the corresponding camera body side optical fibers.

The disclosure of Appendix A is incorporated fully herein by reference.

What is claimed is:

1. A photographic camera having a camera body with a lens receiving mount, an interchangeable lens having a mount removably engagable with the camera body mount, and a plurality of information transmitting elements comprising:

a light source in the camera body;
light receivers in the camera body corresponding to the respective elements;
optical fiber means in the camera body corresponding to the respective elements for coupling light from the source to the lens receiving mount and from the lens receiving mount to the receivers; and
light transmitting means in the lens for returning light associated with the optical fiber means of selected elements to the light receivers of the selected elements, the selected elements representing information transferred from the lens to the camera body.

2. The camera of claim 1, in which the light transmitting means comprises an optical fiber in the lens for each selected element, each optical fiber having an entrance and an exit at the mount of the lens in alignment with the optical fiber means of the corresponding selected element.

3. The camera of claim 1, in which the light transmitting means comprises mirror means in the lens for each selected element to reflect incident light, each mirror means being located at the mount of the lens in alignment with the optical fiber means of the corresponding selected elements.

4. The camera of claim 1, in which the optical fiber means corresponding to each element comprises a first optical fiber coupling light from the source to the lens receiving mount and a second optical fiber coupling light from the lens receiving mount to the light receiver of the corresponding element.

5. The camera of claim 4, in which the light transmitting means comprises an optical fiber in the lens for each selected element, each optical fiber having an entrance aligned with the first optical fiber of the corresponding selected element and an exit aligned with the second optical fiber of the corresponding selected element.

6. The camera body of claim 4, in which the light transmitting means comprises third and fourth optical fibers and a mirror pair in the lens for each selected element, each third optical fiber having an entrance aligned with the first optical fiber of the corresponding selected element, each fourth optical fiber having an exit aligned with the second optical fiber of the corresponding selected element, and each mirror pair is arranged to couple light from the exit of the corresponding third optical fiber to the entrance of the corresponding fourth optical fiber.

7. The camera of claim 6, in which the first, second, third, and fourth optical fibers for each selected element are each conical such that the entrance end of each optical fiber has a bigger diameter area than the exit end thereof.

8. The camera of claim 6, in which the first, second, third, and fourth optical fibers are each cylindrical, each has a concave entrance end, and each has a convex exit end.

9. The camera of claim 1, in which the optical fiber means corresponding to each element comprises an optical fiber and a beam splitter so arranged to couple light from the source to the entrance of the optical fiber and to couple light from the optical fiber to the receiver.

10. The camera of claim 9, in which the light transmitting means comprises a mirror for each selected element to reflect incident light, each mirror being located at the mount of the lens in alignment with the optical fiber of the corresponding selected element so as to reflect incident light from the optical fiber back to the optical fiber.

* * * * *